(12) United States Patent
Matsui et al.

(10) Patent No.: US 10,093,833 B2
(45) Date of Patent: Oct. 9, 2018

(54) COLLOIDAL SILICA POLISHING COMPOSITION AND METHOD FOR MANUFACTURING SYNTHETIC QUARTZ GLASS SUBSTRATES USING THE SAME

(71) Applicant: SHIN-ETSU CHEMICAL CO., LTD., Tokyo (JP)

(72) Inventors: Harunobu Matsui, Joetsu (JP); Daijitsu Harada, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/222,709

(22) Filed: Mar. 24, 2014

(65) Prior Publication Data

US 2014/0295738 A1 Oct. 2, 2014

(30) Foreign Application Priority Data

Apr. 2, 2013 (JP) .................................. 2013-076955

(51) Int. Cl.
*C09G 1/02* (2006.01)
*C09K 3/14* (2006.01)
*B24B 37/04* (2012.01)

(52) U.S. Cl.
CPC .............. *C09G 1/02* (2013.01); *B24B 37/044* (2013.01); *C09K 3/1454* (2013.01)

(58) Field of Classification Search
CPC ........... C09G 1/02; C09K 3/14; B24B 37/044
USPC ............... 451/41, 285; 51/307, 308
See application file for complete search history.

(56) References Cited

U.S. PATENT DOCUMENTS

| | | | |
|---|---|---|---|
| 6,340,374 B1 * | 1/2002 | Kato et al. ....................... | 51/308 |
| 6,719,819 B2 | 4/2004 | Ota et al. | |
| 8,114,178 B2 | 2/2012 | Izumi et al. | |
| 8,357,311 B2 | 1/2013 | Shirota et al. | |
| 8,827,771 B2 | 9/2014 | Otsu et al. | |
| 2002/0028632 A1 * | 3/2002 | Shimamoto et al. ........... | 451/36 |
| 2003/0110711 A1 | 6/2003 | Ota et al. | |
| 2006/0243702 A1 | 11/2006 | Minamihaba et al. | |
| 2007/0075041 A1 * | 4/2007 | Ishibashi et al. ............... | 216/88 |
| 2009/0223136 A1 * | 9/2009 | Nakajo et al. .................... | 51/308 |
| 2010/0072418 A1 * | 3/2010 | Mizutani et al. ............. | 252/79.1 |
| 2010/0164106 A1 * | 7/2010 | Lee et al. ....................... | 257/751 |
| 2010/0243950 A1 | 9/2010 | Harada et al. | |
| 2011/0183581 A1 | 7/2011 | Otsu et al. | |
| 2013/0199106 A1 * | 8/2013 | Ashitaka et al. ............... | 51/308 |
| 2013/0283704 A1 * | 10/2013 | Yoneda et al. .................. | 51/308 |

FOREIGN PATENT DOCUMENTS

| | | | | |
|---|---|---|---|---|
| EP | 1065251 A1 * | 1/2001 | ............... | C09G 1/02 |
| JP | 2002-30274 A | 1/2002 | | |
| JP | 2007-137942 A | 6/2007 | | |
| JP | 2007-191696 A | 8/2007 | | |
| JP | 2008-270584 A | 11/2008 | | |
| JP | 2009-7543 A | 1/2009 | | |
| JP | 2009-231486 A | 10/2009 | | |
| JP | 2010-080499 A | 4/2010 | | |
| WO | 01/85868 A1 | 11/2001 | | |
| WO | 2009/154164 A1 | 12/2009 | | |

OTHER PUBLICATIONS

Extended European Search Report dated Sep. 18, 2014, issued in corresponding European Patent Application No. 14162450.2 (7 pages).

Office Action dated Nov. 22, 2016, issued in counterpart Japanese Patent Application No. 2014-045807, with English translation. (11 pages).

Office Action dated Apr. 17, 2018, issued in counterpart Japanese Application No. 2017-077292, with English machine translation. (8 pages).

* cited by examiner

*Primary Examiner* — Eileen Morgan
(74) *Attorney, Agent, or Firm* — Westerman, Hattori, Daniels & Adrian, LLP

(57) ABSTRACT

A polishing composition comprising a colloidal dispersion of spherical silica particles and associated silica particles as abrasive is provided. When used in the step of polishing synthetic quartz glass substrates, the polishing composition ensures a higher polishing rate than conventional colloidal silica and is effective for preventing any microscopic defects on the substrate surface, thus providing the substrate with a high smoothness. The polishing composition can be used as the ceria replacement polishing composition for polishing a lapped surface.

12 Claims, No Drawings

COLLOIDAL SILICA POLISHING COMPOSITION AND METHOD FOR MANUFACTURING SYNTHETIC QUARTZ GLASS SUBSTRATES USING THE SAME

CROSS-REFERENCE TO RELATED APPLICATION

This non-provisional application claims priority under 35 U.S.C. § 119(a) on Patent Application No. 2013-076955 filed in Japan on Apr. 2, 2013, the entire contents of which are hereby incorporated by reference.

TECHNICAL FIELD

This invention relates to a colloidal silica polishing composition and a method for manufacturing synthetic quartz glass substrates using the same. The colloidal silica polishing composition is used in the polishing of synthetic quartz glass substrates intended for the advanced technologies, such as photomasks, nanoimprint substrates, and liquid crystal color filters. The term "polishing composition" is also referred to as polishing compound or slurry.

BACKGROUND ART

In the step of polishing synthetic quartz glass substrates for use as photomasks, liquid crystal substrates or the like, polishing compositions containing cerium oxide (ceria) or colloidal silica are often used.

Since synthetic quartz glass substrates for use as photomasks, liquid crystal substrates or the like are required to have a high flatness, high smoothness and low defectiveness, several steps including lapping and polishing steps are carried out for surface adjustment until the substrates are ready for use as the product.

The lapping step is to remove the residual strain by slicing of an ingot into substrates. The polishing step is to polish substrates to mirror finish to increase their surface flatness and tailor their topography. The final polishing step uses a polishing composition of colloidal silica with a smaller particle size to produce substrates having a flat and smooth surface and devoid of microscopic defects.

In the step of polishing substrates to mirror finish, a ceria polishing composition is commonly used and effective. Under the current situation that has faced a steep rise in rare earth prices, engineers make extensive efforts to develop replacement polishing compositions or recovery techniques for the purpose of reducing the amount of ceria used.

For example, Patent Document 1 discloses a polishing composition obtained by mixing ceria with zirconium oxide (zirconia) to form complex oxide particles. Glass substrates are polished using this polishing composition. Since Patent Document 1 does not completely free the composition of ceria, the polishing composition is not regarded as a complete ceria replacement polishing composition. Mixing of zirconia invites a change in zeta potential on surfaces of ceria particles and zirconia particles, leaving concerns that the dispersibility of the polishing composition is exacerbated and more residues are formed on the surface of substrates as polished.

Patent Document 2 describes that using colloidal silica particles of non-spherical shape and varying aspect ratio, semiconductor wafers are polished at a higher polishing rate than the use of conventional colloidal silica. In Patent Document 2, as $SiO_2$ originating from glass substrates binds with colloidal silica particles, colloidal silica particles gradually approach spherical shape, inviting a drop of polishing rate. In addition, since colloidal silica particles are of irregular shape or varying aspect ratio, they are effective for suppressing scratches to the substrate surface, but tend to form microscopic defects which can be killer defects in photomask substrates.

CITATION LIST

Patent Document 1: JP-A 2009-007543
Patent Document 2: JP-A 2008-270584 (U.S. Pat. No. 8,114,178)

DISCLOSURE OF INVENTION

An object of the invention is to provide a colloidal silica polishing composition which, when used in the step of polishing synthetic quartz glass substrates, ensures a high polishing rate while restraining any scratches and microscopic defects on the substrate surface. Another object is to provide a method for manufacturing synthetic quartz glass substrates using the same.

Placing a focus on colloidal silica particles used as abrasive in the polishing of synthetic quartz glass substrates, the inventors have reached the following discovery. A mixture of colloidal silica particles of spherical type and association type having different average primary particle size and degree of association is effective for polishing, particularly when the average primary particle size of associated colloidal silica particles is greater than that of spherical colloidal silica particles. During the polishing operation, the spherical colloidal silica particles are moved away from the substrate due to the centrifugal force, so that less spherical colloidal silica particles are available on the substrate than associated colloidal silica particles. As a result, microscopic defects on the substrate surface are suppressed and the substrate is given high smoothness. Whenever the polishing composition is applied, an improvement in polishing rate is possible on substrates of any size and type.

As used herein, the "spherical colloidal silica" refers to a colloidal dispersion of silica particles of spherical shape having an average sphericity (degree of true sphericity) of 1.0 to 1.1, preferably having an average primary particle size D1A of 20 to 120 nm and a degree of association n1 of up to 1.5. The "average sphericity" is determined by randomly picking up 100 silica particles, calculating a ratio of maximum diameter to minimum diameter of particles, and averaging the ratio. The "association type" refers to the aggregation of spherical colloidal silica particles, and the "associated colloidal silica" refers to a colloidal dispersion of silica aggregates, preferably having an average primary particle size D1B of 70 to 200 nm and a degree of association n2 of at least 2.0.

In one aspect, the invention provides a colloidal silica polishing composition comprising a colloidal solution containing spherical colloidal silica particles and associated colloidal silica particles.

In a preferred embodiment, the spherical colloidal silica particles have an average primary particle size D1A and the associated colloidal silica particles have an average primary particle size D1B which is greater than D1A.

In preferred embodiments, the spherical colloidal silica particles have an average primary particle size D1A which is in a range of 20 to 120 nm; the associated colloidal silica particles have an average primary particle size D1B which is in a range of 70 to 200 nm; the spherical colloidal silica particles have a degree of association (n1) which is in a range of 1.0 to 1.5; and the associated colloidal silica particles have a degree of association (n2) which is in a range of 2.0 to 3.5

In a preferred embodiment, an amount of the spherical colloidal silica particles is 2 to 5 times an amount of the associated colloidal silica particles on a weight basis.

In another aspect, the invention provides a method for manufacturing a synthetic quartz glass substrate, comprising a semi-final or final polishing step using the colloidal silica polishing composition defined above.

ADVANTAGEOUS EFFECTS OF INVENTION

When used in the step of polishing synthetic quartz glass substrates, the colloidal silica polishing composition of the invention ensures a higher polishing rate than conventional colloidal silica and is effective for restraining any microscopic defects on the substrate surface, thus providing the substrate with a high smoothness. The polishing composition of the invention can be used as the ceria replacement polishing composition for polishing a lapped surface, offering one solution to the outstanding rare earth problems.

DESCRIPTION OF PREFERRED EMBODIMENTS

The colloidal silica particles for use in the polishing of substrates according to the invention are a mixture of colloidal silica particles of different type, that is, spherical type and association type, especially having different average primary particle size and degree of association, obtained from hydrolysis of water glass or organic silicate compounds such as alkoxysilanes.

The colloidal silica particles of different type are used for the following reason. In polishing substrates, typically synthetic quartz glass substrates, colloidal silica particles are generally used as abrasive in the final polishing step. This is because substrates can be polished to a less defective, highly smooth surface by using colloidal silica particles which have a smaller particle size and smoother surface than ceria and other abrasive particles. However, the polishing rate is slow because of the small particle size. The polishing step serves to remove only a minute amount of material from the substrate surface. In this sense, the colloidal silica particles are not regarded as having a high grinding force. Quite unexpectedly, when a polishing composition based on a mixture of colloidal silica particles having different particle size is used, the percent space occupation per unit volume by colloidal silica particles is increased, and consequently, a probability of collision of abrasive particles against the glass substrate is increased, leading to an improvement in grinding force. While the closest packing structure per unit volume is constructed by associated colloidal silica particles having the same average primary particle size, spherical colloidal silica particles having a smaller average primary particle size than the associated colloidal silica particles enter interstices in the closest packing structure, increasing the packing density per unit volume. As a result, abrasive particles having a high grinding force are available.

Since colloidal silica particles of different type, that is, spherical type and association type are mixed so that they may exert the respective steric characteristics, not only the polishing rate is improved, but also a reduction in the number of defects and an improvement in smoothness of the substrate surface are achieved at the same time.

The polishing mechanism is described in further detail. Since associated colloidal silica particles are of distorted or deformed shape as compared with spherical colloidal silica particles, the contact area of abrasive particles with the substrate is small and approximate to point contact. Therefore, the force transmitted from the polishing plate to the substrate via abrasive particles can be increased, leading to an improved grinding force.

The packing structure per unit cubic volume constructed solely by associated colloidal silica particles includes voids where any particles are absent. Once spherical colloidal silica particles are mixed therewith, they fill in the voids, leading to an increased grinding force and hence, an accelerated polishing rate.

With respect to the average primary particle size D1 of colloidal silica particles, it is preferred that the average primary particle size D1B of associated colloidal silica particles be greater than the average primary particle size D1A of spherical colloidal silica particles.

The grinding force may be increased using associated colloidal silica particles alone. However, since associated colloidal silica particles have distorted surface topography, the substrate as polished may have a relatively rough surface. On the other hand, when the substrate surface is polished using spherical colloidal silica particles alone, a substrate having a less defective, highly smooth surface is obtained. Now that colloidal silica particles participating in polishing are distributed in the rotating system, if the average primary particle size D1B of associated colloidal silica particles is greater than the average primary particle size D1A of spherical colloidal silica particles, then associated colloidal silica particles are preferentially moved away from the substrate surface under the action of centrifugal force. There is established a polishing model that polishing proceeds in order from associated colloidal silica particles to spherical colloidal silica particles. This polishing model is more preferred.

The average primary particle size D1A of spherical colloidal silica particles is preferably in a range of 20 to 120 nm, more preferably 40 to 100 nm, and even more preferably 50 to 100 nm. If the average primary particle size D1A of spherical colloidal silica particles is less than 20 nm, such fine particles are difficult to remove during the cleaning step subsequent to the polishing step, with a risk that microscopic protruding residues are left as defects. On the other hand, if the average primary particle size D1A of spherical colloidal silica particles exceeds 120 nm, they may be difficulty accommodated in voids created by associated colloidal silica particles and fail to fully exert the grinding force as abrasive.

The degree of association n1 of spherical colloidal silica particles is preferably up to 1.5, more preferably in a range of 1.0 to 1.5. If the degree of association n1 of spherical colloidal silica particles exceeds 1.5, then they may not fully enter voids created by associated colloidal silica particles and fail to fully increase the packing factor per unit cubic volume, thus failing to increase the grinding force and to exert effects of accelerating the polishing rate. It is noted that the degree of association n is defined as the average secondary particle size divided by the average primary particle size, wherein the average primary particle size is computed from the value of specific surface area measured by the BET method, and the average secondary particle size is computed from the measured value of scattering intensity of dynamic light scattering by a red laser.

The average primary particle size D1B of associated colloidal silica particles is preferably in a range of 70 to 200 nm, more preferably 70 to 170 nm, and even more preferably 80 to 150 nm. If the average primary particle size D1B of associated colloidal silica particles is less than 70 nm, such particles are approximate to spherical shape, failing to obtain a satisfactory grinding force or to accelerate the polishing rate. On the other hand, if the average primary particle size D1A of associated colloidal silica particles exceeds 200 nm, the particles themselves have a high specific gravity so that a failure of dispersion may arise.

The degree of association n2 of associated colloidal silica particles is preferably at least 2.0, more preferably in a range of 2.0 to 3.5. If the degree of association n2 of associated colloidal silica particles is less than 2.0, then they may not have a necessary distortion to gain a grinding force.

In the colloidal silica polishing composition, the spherical colloidal silica particles are preferably present in an amount of 2 to 5 times, more preferably 2 to 4 times the amount of associated colloidal silica particles, on a weight basis. If the amount of spherical colloidal silica particles is less than 2 times the amount of associated colloidal silica particles, there may arise a problem that the substrate as polished has an unacceptable surface roughness. If the amount of spherical colloidal silica particles is more than 5 times the amount of associated colloidal silica particles, the spherical colloidal silica particles exert a predominant effect to polishing, resulting in a reduction of grinding force and difficulty to increase the polishing rate.

Also, regarding a ratio of spherical colloidal silica particles and associated colloidal silica particles, spherical colloidal silica particles are preferably present in an amount of 50 to 80 parts by weight, more preferably 50 to 75 parts by weight, even more preferably 60 to 75 parts by weight. Associated colloidal silica particles are preferably present in an amount of 20 to 50 parts by weight, more preferably 25 to 50 parts by weight, even more preferably 25 to 40 parts by weight. The total amount of spherical colloidal silica particles and associated colloidal silica particles is 100 parts by weight. A mixture of the particles is preferably 25 to 50% by weight, more preferably 35 to 50% by weight of the polishing composition.

The colloidal silica particles used herein may be prepared by a variety of methods. For example, they may be obtained by granulation from water glass or hydrolysis of organic silicates such as alkoxysilanes. It is preferred from the aspect of shelf stability of colloidal silica that a liquid dispersion of colloidal silica particles be kept at a weakly alkaline level. In some cases, the dispersion may be used even at a neutral or acidic level. While colloidal silica is generally used as a dispersion in water, another dispersing medium may be used, for example, alcohols such as ethanol and isopropyl alcohol, ketones such as acetone and methyl ethyl ketone, aromatic compounds such as benzene, toluene, and xylene, and a mixture of such an organic solvent and water.

As mentioned above, the colloidal silica polishing composition used herein may be obtained as a colloidal solution (exactly, colloidal silica dispersion) by dispersing spherical colloidal silica particles and associated colloidal silica particles in a dispersing medium. The colloidal silica polishing composition may also be obtained by combining commercially available colloidal silica dispersions. For example, dispersions of spherical colloidal silica are commercially available under the trade name of Snowtex® series from Nissan Chemical Industries, Ltd., COMPOL®-50, COMPOL-80, COMPOL-120, COMPOL-EX III from Fujimi Inc., and Syton® and Mazin® from DuPont. Dispersions of associated colloidal silica are commercially available under the trade name of ST-UP and ST-CUP from Nissan Chemical Industries, Ltd., TCSOL series from Tama Chemicals Co., Ltd., and PL series from Fuso Chemical Co., Ltd.

When substrates such as synthetic quartz glass substrates are polished using the polishing composition, an appropriate amount of a polishing accelerator may be added to the polishing composition, if desired. The addition of a polishing accelerator to the polishing composition is expected to achieve an improvement in dispersion and maintain a high polishing rate because the electric double layer around colloidal silica particles is stabilized. Suitable polishing accelerators include polyacrylic acid, polyacrylates, poly(meth)acrylic acid, poly(meth)acrylates, formaldehyde condensates, and polyphosphates. When used, the polishing accelerator is preferably added in an amount of 10 to 20% by weight based on the colloidal silica (solids of colloidal solution).

Examples of the substrate which can be polished using the polishing composition of the invention include synthetic quartz glass substrates, lithium tantalate substrates, silicon substrates, glass substrates for HDD, and soda-lime glass substrates. The polishing composition is useful particularly in the polishing step involved in a method of manufacturing synthetic quartz glass substrates for use as photomasks, nanoimprint substrates, liquid crystal color filters and the like. With respect to the substrate size, rectangular shape substrates of 5 inch squares (127.0×127.0 mm) or 6 inch squares (152.4×152.4 mm), circular shape substrates having a diameter of 6 inches (152.4 mm) or 8 inches (203.2 mm), and large-size substrates of G8 (1220×1400 mm) or G10 (1620×1780 mm) are preferred.

The method of manufacturing substrates generally involves the steps of ingot shaping, annealing, slicing into substrates, chamfering, lapping, polishing the substrate surface to mirror finish, rough polishing, and semi-final polishing, and final polishing. The colloidal silica polishing composition of the invention is often used in the semi-final or final polishing step, and in combination with suede-type polishing pads. The final polishing step is typically carried out under a pressure of 60 to 200 gf/cm$^2$.

When it is desired to make the substrate surface more smooth and substantially defect-free, the colloidal silica polishing composition of the invention may be used in the semi-final polishing step, and colloidal silica particles of smaller particle size be used as abrasive in the final polishing step.

The polishing step using the colloidal silica polishing composition is generally batchwise double-side polishing although single-side polishing or single-wafer polishing or a combination thereof is also acceptable.

EXAMPLE

Examples of the invention are given below by way of illustration and not by way of limitation.

Example 1

A synthetic quartz glass substrate of 6 inch squares (6.35 mm thick) as sliced was lapped and roughly polished before it was subjected to final polishing. The final polishing step used a soft suede-type polishing pad. The polishing composition was a colloidal silica dispersion containing 3 parts by weight of spherical colloidal silica particles having an average primary particle size of 50 nm and a degree of association of 1.2 (Snowtex® XL by Nissan Chemical Industries, Ltd.) and 1 part by weight of associated colloidal silica particles having an average primary particle size of 100 nm and a degree of association of 2.5 (TCSOL704 by Tama Chemicals Co., Ltd.) (weight ratio 3:1) and having a SiO₂ concentration of 40% by weight in water. A double-side polishing machine was operated at a polishing pressure of 100 gf/cm² and a polishing rate of 0.2 μm/min.

The polishing step was followed by cleaning and drying. Using a laser confocal optical system high-sensitivity flaw detector (Laser Tec Co., Ltd.), the substrate was inspected for any defects. The number of defects of 50 nm or greater size was 1.5. Using an atomic force microscope (AFM), the substrate surface was measured for roughness (Ra), finding Ra=0.14 nm. No polish-affected damages (including scratches and pits) were detected.

Comparative Example 1

The same substrate as in Example 1 was polished using a soft suede-type polishing pad. The polishing composition was a colloidal silica dispersion containing spherical colloidal silica particles having an average primary particle size of 80 nm and a degree of association of 1.1 (COMPOL®-80 by Fujimi Inc.) and having a SiO₂ concentration of 40% by weight in water. A double-side polishing machine was operated at a polishing pressure of 100 gf/cm² and a polishing rate of 0.07 μm/min.

The polishing step was followed by cleaning and drying. On defect inspection as in Example 1, the number of defects of 50 nm or greater size was 1.8. The surface roughness (Ra) was measured as in Example 1, finding Ra=0.14 nm. No polish-affected damages (including scratches and pits) were detected.

Comparative Example 2

The same substrate as in Example 1 was polished using a soft suede-type polishing pad. The polishing composition was a colloidal silica dispersion containing spherical colloidal silica particles having an average primary particle size of 110 nm and a degree of association of 1.2 (Snowtex® ZL by Nissan Chemical Industries, Ltd.) and having a SiO₂ concentration of 20% by weight in water. A double-side polishing machine was operated at a polishing pressure of 100 gf/cm² and a polishing rate of 0.06 μm/min.

The polishing step was followed by cleaning and drying. On defect inspection as in Example 1, the number of defects of 50 nm or greater size was 2.1. The surface roughness (Ra) was measured as in Example 1, finding Ra=0.25 nm. No polish-affected damages (including scratches and pits) were detected.

Example 2

A synthetic quartz glass substrate of 8 inch diameter (0.775 mm thick) as sliced was lapped and roughly polished before it was subjected to final polishing. The final polishing step used the same polishing pad as in Example 1. The polishing composition was a colloidal silica dispersion containing 4 parts by weight of spherical colloidal silica particles having an average primary particle size of 60 nm and a degree of association of 1.3 (COMPOL®-120 by Fujimi Inc.) and 1 part by weight of associated colloidal silica particles having an average primary particle size of 90 nm and a degree of association of 2.8 (PL-7H by Fuso Chemical Co., Ltd.) (weight ratio 4:1) and having a SiO₂ concentration of 35% by weight in water. A double-side polishing machine was operated at a polishing pressure of 100 gf/cm² and a polishing rate of 0.07 atm/min.

The polishing step was followed by cleaning and drying. On defect inspection as in Example 1, the number of defects of 50 nm or greater size was 2.0. The surface roughness (Ra) was measured as in Example 1, finding Ra=0.17 nm. No polish-affected damages (including scratches and pits) were detected.

Comparative Example 3

The same substrate as in Example 2 was polished using a soft suede-type polishing pad. The polishing composition was a colloidal silica dispersion containing spherical colloidal silica particles having an average primary particle size of 80 nm and a degree of association of 1.1 (COMPOL®-80 by Fujimi Inc.) and having a SiO₂ concentration of 40% by weight in water. A double-side polishing machine was operated at a polishing pressure of 100 gf/cm² and a polishing rate of 0.01 μm/min.

The polishing step was followed by cleaning and drying. On defect inspection as in Example 1, the number of defects of 50 nm or greater size was 2.8. The surface roughness (Ra) was measured as in Example 1, finding Ra=0.15 nm. No polish-affected damages (including scratches and pits) were detected.

Japanese Patent Application No. 2013-076955 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A colloidal silica polishing composition comprising a colloidal solution containing spherical colloidal silica particles and associated colloidal silica particles,
   wherein an amount of the spherical colloidal silica particles is 2 to 5 times an amount of the associated colloidal silica particles on a weight basis and a mixture of the spherical colloidal silica particles and the associated colloidal silica particles is contained in an amount of 35 to 50% by weight of the polishing composition.

2. The polishing composition of claim 1 wherein the spherical colloidal silica particles have an average primary particle size D1A and the associated colloidal silica particles have an average primary particle size D1B which is greater than D1A.

3. The polishing composition of claim 1 wherein the spherical colloidal silica particles have an average primary particle size D1A which is in a range of 20 to 120 nm.

4. The polishing composition of claim 1 wherein the associated colloidal silica particles have an average primary particle size D1B which is in a range of 70 to 200 nm.

5. The polishing composition of claim 1 wherein the spherical colloidal silica particles have a degree of association (n1) which is in a range of 1.0 to 1.5.

6. The polishing composition of claim 1 wherein the associated colloidal silica particles have a degree of association (n2) which is in a range of 2.0 to 3.5.

7. A method for manufacturing a synthetic quartz glass substrate, comprising a semi-final or final polishing step using the colloidal silica polishing composition of claim 1.

8. A method for manufacturing a synthetic quartz glass substrate, comprising a semi-final or final polishing step using the colloidal silica polishing composition of claim 2.

9. A method for manufacturing a synthetic quartz glass substrate, comprising a semi-final or final polishing step using the colloidal silica polishing composition of claim 3.

10. A method for manufacturing a synthetic quartz glass substrate, comprising a semi-final or final polishing step using the colloidal silica polishing composition of claim 4.

11. A method for manufacturing a synthetic quartz glass substrate, comprising a semi-final or final polishing step using the colloidal silica polishing composition of claim 5.

12. A method for manufacturing a synthetic quartz glass substrate, comprising a semi-final or final polishing step using the colloidal silica polishing composition of claim 6.

* * * * *